(12) United States Patent
Reese et al.

(10) Patent No.: US 11,401,394 B2
(45) Date of Patent: Aug. 2, 2022

(54) METHOD FOR ALTERING POLYMER PROPERTIES FOR MOLDING OF PARTS

(71) Applicant: Arris Composites Inc., Berkeley, CA (US)

(72) Inventors: Riley Reese, Oakland, CA (US); Ethan Escowitz, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 17/014,679

(22) Filed: Sep. 8, 2020

(65) Prior Publication Data

US 2021/0070955 A1 Mar. 11, 2021

Related U.S. Application Data

(60) Provisional application No. 62/896,894, filed on Sep. 6, 2019.

(51) Int. Cl.
| | | |
|---|---|---|
| *B29C 71/02* | (2006.01) | |
| *C08J 7/12* | (2006.01) | |
| *B29C 35/08* | (2006.01) | |
| *B29C 70/06* | (2006.01) | |

(52) U.S. Cl.
CPC .............. *C08J 7/08* (2013.01); *B29C 35/0805* (2013.01); *B29C 70/06* (2013.01); *C08J 7/123* (2013.01); *B29C 2035/0827* (2013.01); *B29C 2035/0838* (2013.01)

(58) Field of Classification Search
CPC ...... C08J 5/06; C08J 5/04; C08J 5/0405; C08J 5/042; C08J 5/043; C08J 7/08; C08J 7/123; B29C 66/024; B29C 66/0242; B29C 66/026; B29C 66/028; B29C 35/0805; B29C 2035/0827; B29C 2035/0283; B29C 2035/0838; B29C 70/06; B29C 70/08; B29C 70/10; B29C 43/003; B29C 43/14; B29C 43/021
See application file for complete search history.

(56) References Cited

U.S. PATENT DOCUMENTS 4,999,069 A * 3/1991 Brackett ............... B29C 65/006
 156/153
6,838,156 B1 * 1/2005 Neyer ................... B29C 66/028
 428/172

\* cited by examiner

*Primary Examiner* — Michael P Wieczorek
(74) *Attorney, Agent, or Firm* — Kaplan Breyer Schwarz, LLP

(57) ABSTRACT

A method for altering polymer properties for the molding of parts comprises exposing, to a scission-causing stressor, a region of a polymer form. The scission-causing stressor is controlled to achieve, in a relatively higher molecular-weight polymer at the region, an amount of scission that results in a reduction in the molecular weight of the relatively higher molecular-weight polymer, thereby forming a relatively lower molecular-weight polymer at the region.

13 Claims, 5 Drawing Sheets

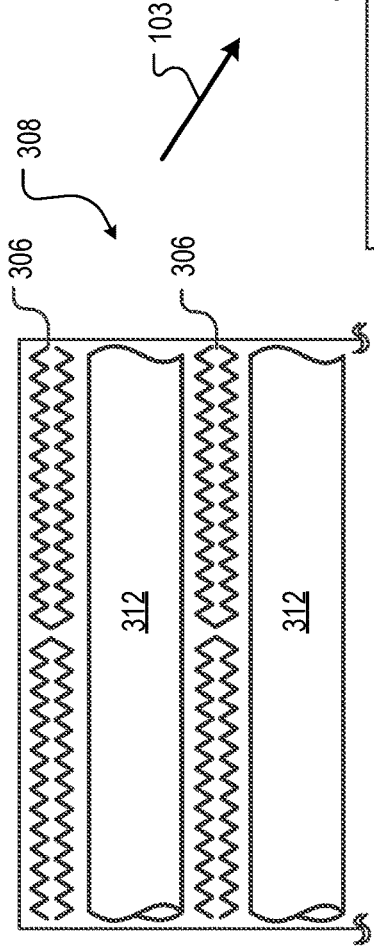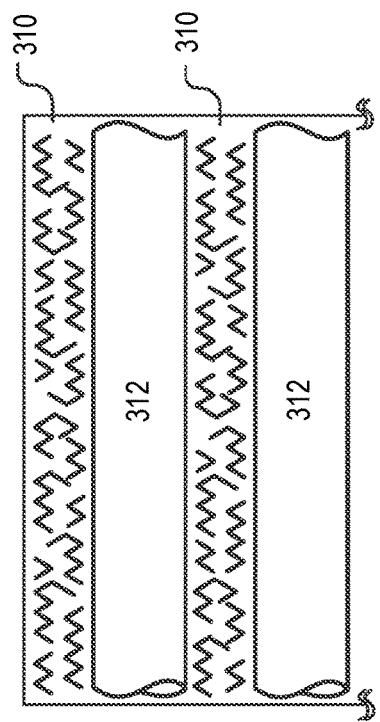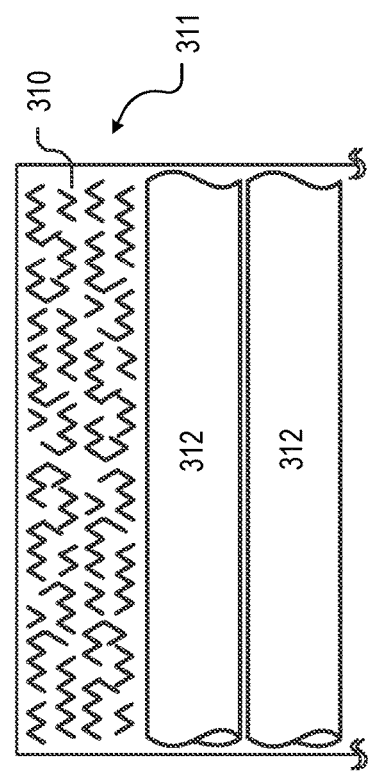

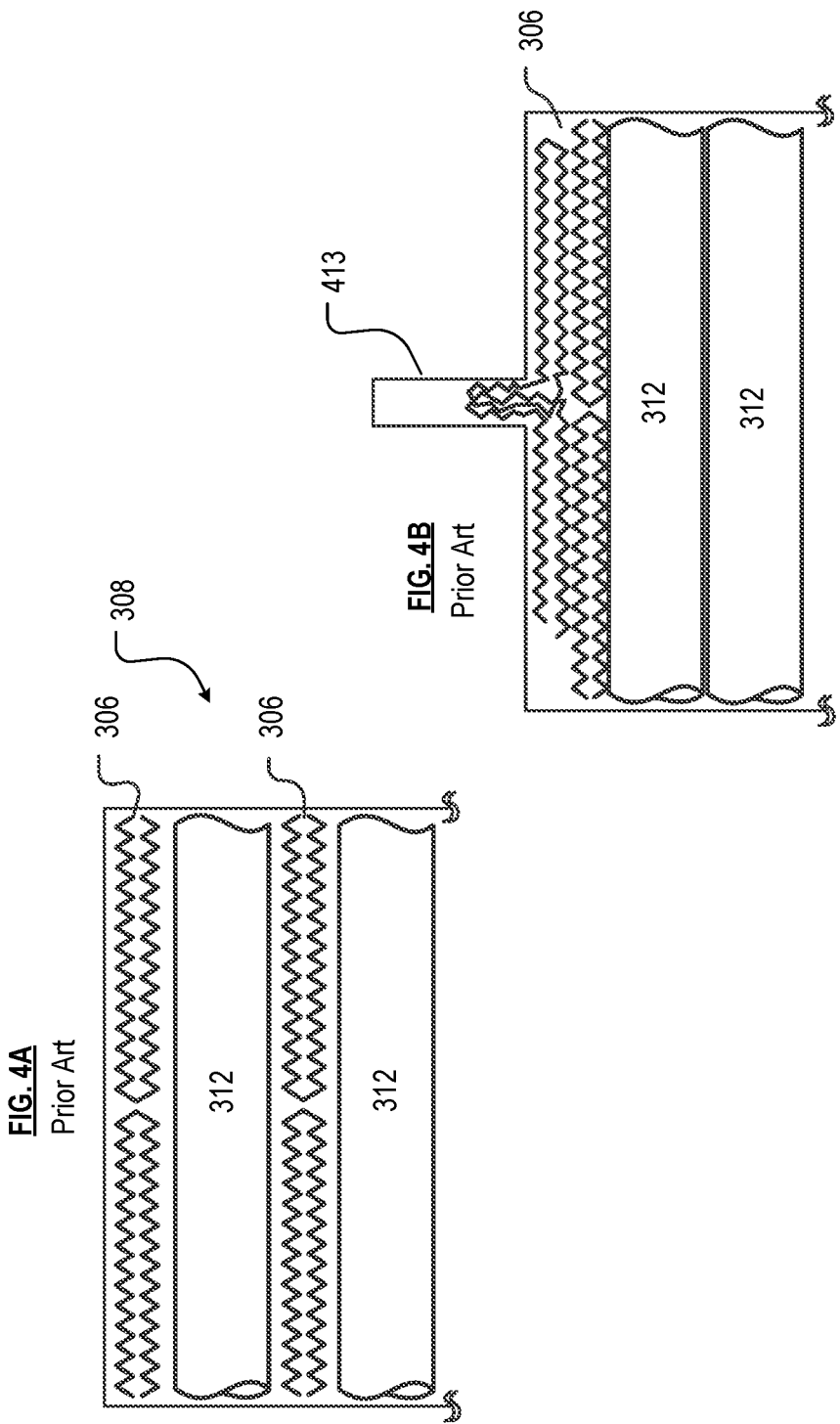

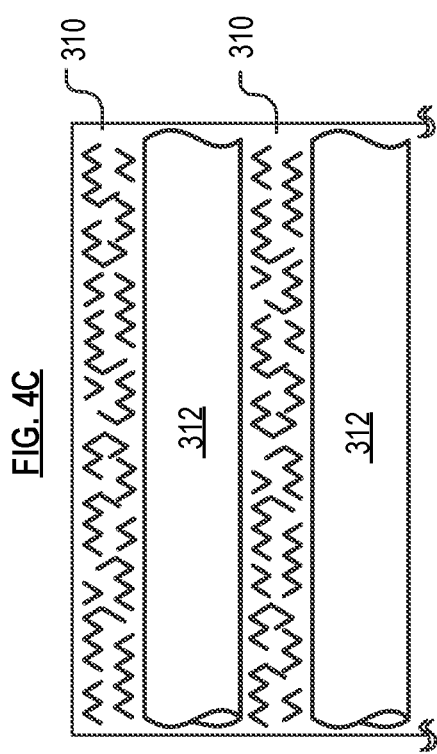
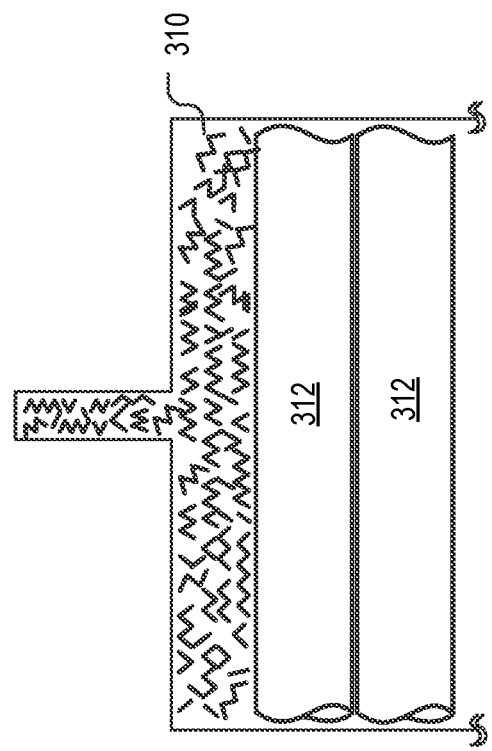

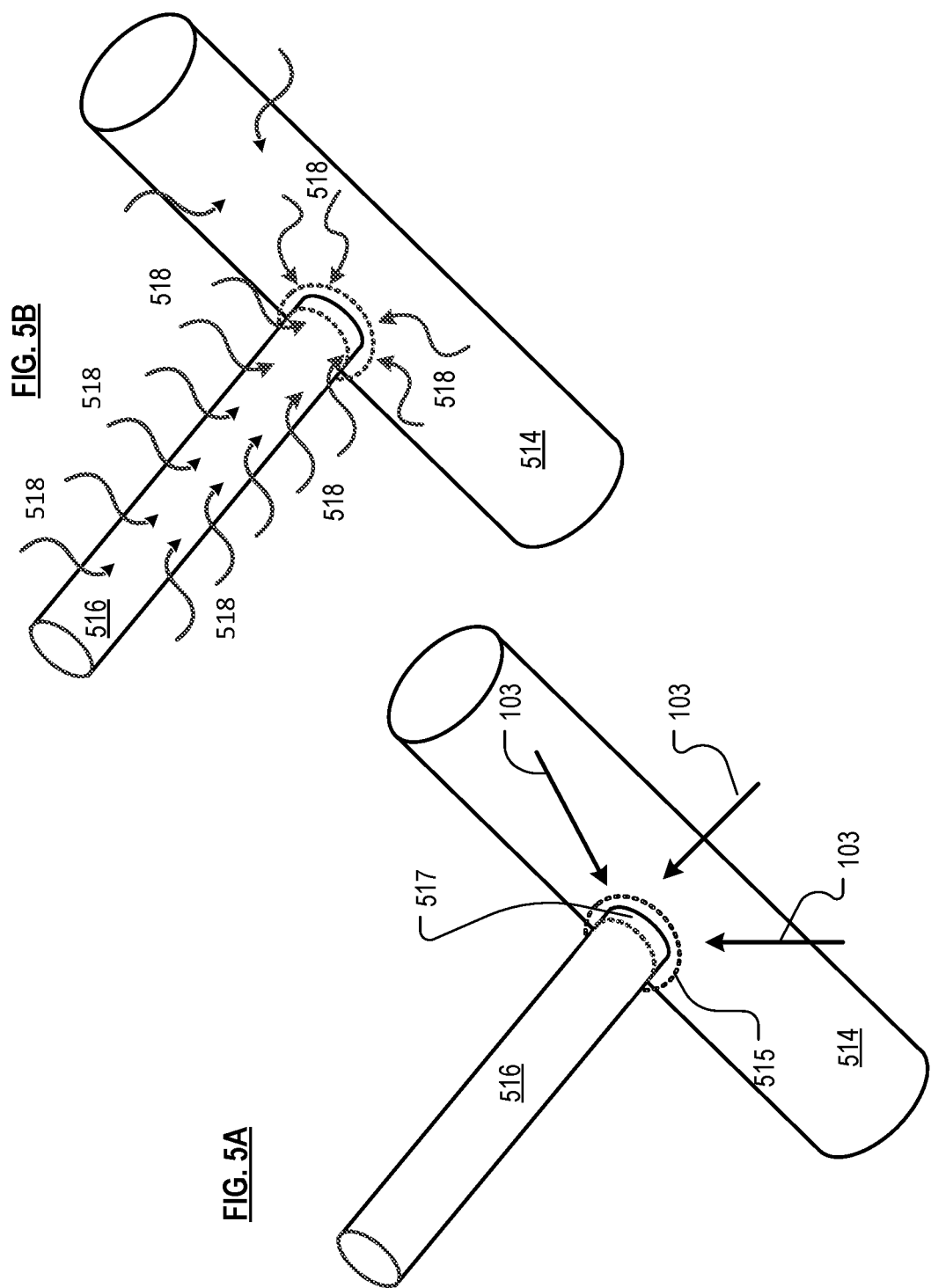

METHOD FOR ALTERING POLYMER PROPERTIES FOR MOLDING OF PARTS

STATEMENT OF RELATED CASES

This case claims priority to U.S. patent application Ser. No. 62/896,894, filed Sep. 6, 2019 and incorporated by reference herein.

FIELD OF THE INVENTION

The present invention relates to polymers and their use in molding processes.

BACKGROUND

In the manufacture of a part via a molding process, it is common for the part to include fine features (e.g., small features, intricate features, etc.). The intended function of such a part will usually dictate the material—the polymer resin—from which it is made. A part requiring greater strength, for example, will often be formed from a relatively higher molecular-weight polymer. Molecular weight refers to the average length of the chains in a polymer. A higher molecular weight corresponds to longer polymer chains, and, in general, correlates to better mechanical properties, higher melt and glass transition temperatures, and higher viscosity (decreased melt flow) compared to shorter polymer chains (e.g., lower molecular weight polymers).

If the use application for a part requires a relatively higher molecular-weight polymer resin, forming fine features of the part can be problematic. In particular, as noted above, in a polymer, relatively higher molecular weight corresponds to relatively longer polymer chains, and a decreased tendency for the polymer to flow in the melt phase. This decreased melt flow makes it more difficult to fill a small void that, when filled, forms the fine feature.

If the part is formed as a composite material, so that it includes fibers (e.g., carbon fiber, etc.) as well as a polymer resin, use of a relatively higher molecular-weight resin can be problematic where, for example, a specific surface finish (e.g., smooth, visually consistent, etc.) is required. Specifically, the polymer may not readily flow to the region that will be the surface of the part, leaving the surface with visually exposed and potentially even physically exposed fibers.

SUMMARY

The present invention addresses some of the drawbacks of the prior art as mentioned above. In accordance with the present teachings, the molecular weight of select regions of a polymer form are reduced, thereby increasing the melt flow and lowering the melt temperature in such regions.

Selective molecular-weight reduction in accordance with the present teachings creates a hybrid low/high molecular-weight polymer form. This hybrid molecular-weight polymer form has high melt flow, lower strength/stiffness in certain regions (i.e., the relatively lower molecular-weight regions) and low melt flow, high strength/stiffness in other regions (i.e., the relatively higher molecular-weight regions). This is advantageous in molding applications where, for example and without limitation, it is desirable for relatively lower molecular-weight region(s) of the polymer form:

(i) to fill fine features;
(ii) to melt preferentially while other, relatively higher molecular-weight regions of a polymer form remain solid;
(iii) to flow to the surface to create resin-rich areas, particularly when using composite materials (i.e., fiber and resin);
(iv) to achieve a specific purpose, such as any of (i) through (iii) above, while leaving polymer unaltered (maintaining relatively higher molecular weight) in regions of the polymer form that are anticipated to be subjected to high-stress when in use.

To achieve this localized change in molecular weight, a portion of the polymer form is exposed to a scission-causing stressor. The scission-causing stressor causes chain scission of the relatively higher molecular-weight polymer, resulting in a relatively lower-weight polymer. Stressors include a variety of known factors, such as UV radiation, oxygen exposure, moisture, heat cycling, chemical exposure, ultrasonic radiation, and the like. The stressor is controllably introduced to cause a breakdown of polymer at one or more desired regions of the polymer form.

Thus, in an illustrative embodiment, the invention provides a method comprising exposing, to a first scission-causing stressor, a first region of a first polymer form, wherein:

a first parameter of the first scission-causing stressor is controlled to achieve a first amount of scission in a first relatively higher molecular-weight polymer at the first region, the first amount of scission resulting in a reduction in a weight average molecular weight of the first relatively higher molecular-weight polymer, thereby forming a first relatively lower molecular-weight polymer at the first region, the reduction is in a range of about 10 to about 50 percent, and the weight average molecular weight of the first relatively higher molecular-weight polymer at a second region of the first polymer form is not reduced.

In some further embodiments, the invention provides, in addition to steps of the illustrative embodiment, that the first polymer form comprises fibers, the method comprising creating a desired surface finish of the first polymer form, or a part formed therefrom, by applying pressure to the first polymer form, the pressure causing the first relatively lower molecular-weight polymer to flow to a surface of the first polymer form, wherein the desired surface finish is characterized by a lack of a visible or physical presence of the fibers.

In some further embodiments, the invention provides, in addition to steps of the illustrative embodiment, and when in the presence of fibers, that the first polymer form is disposed in a mold cavity, the method comprising flowing the first relatively lower molecular-weight polymer into a first cavity for forming a fine feature, and completely filling the first cavity therewith by applying pressure to the mold cavity.

In some further embodiments, the invention provides, in addition to steps of the illustrative embodiment, exposing, to a second scission-causing stressor, a first region of a second polymer form; and applying heat to the first polymer form and the second polymer form, thereby bonding the first region of the first polymer form to the first region of the second polymer form.

In some further embodiments, the invention provides a method comprising exposing, to a scission-causing stressor, a first region of a first polymer form and a first region of a second polymer form, wherein the first and second polymer forms abut one another at the respective first regions thereof, and wherein the scission-causing stressor is controlled to achieve a first amount of scission in a relatively higher molecular-weight polymer at the first regions, the first amount of scission results in a reduction in a weight average molecular weight of the relatively higher molecular-weight polymer, thereby forming a relatively lower molecular-weight polymer at the first regions, the weight average molecular weight of the relatively higher molecular-weight polymer at a second region of each of the first and second polymer forms is not reduced; and applying heat to the first polymer form and the second polymer form, wherein the heat is applied at or above a melt temperature of the relatively lower molecular-weight polymer, and below the melt temperature of the relatively higher molecular-weight polymer, thereby bonding the first and second polymer forms together at the respective first regions.

In some further embodiments, the invention provides a method comprising placing, in a mold cavity, a first polymer form having a relatively lower molecular-weight polymer at a first region thereof and a relatively higher molecular-weight polymer at a second region thereof; applying heat and pressure to the mold cavity; and molding a part.

In further embodiments, the invention provides methods that include, in addition to the features of the aforementioned embodiments, at least one additional feature disclosed herein and in the appended drawings.

BRIEF DESCRIPTION OF THE DRAWINGS

FIGS. 3A-3C depict the present teachings being applied to improve the surface finish of a part, in accordance with an embodiment of the present invention.

FIGS. 4A-4B depict a prior-art approach for creating a part having a fine (small) feature.

FIGS. 4C-4D depict the present teachings being applied to create a part having a fine (small) feature, in accordance with an embodiment of the present invention.

FIG. 5A-5B depict the present teachings being applied for bonding polymer materials together, such as tacking preforms together prior to molding.

DETAILED DESCRIPTION

Figure 1:
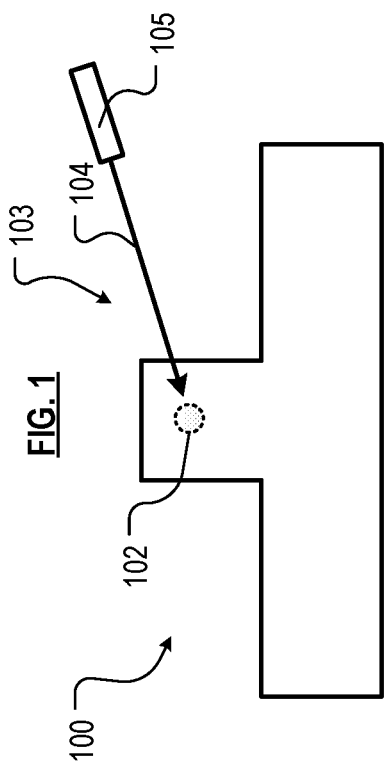
FIG. 1 depicts a region of a part being exposed to a scission-causing stressor in accordance with the illustrative embodiment of the present invention.

The following terms, and their inflected forms, are defined for use in this disclosure and the appended claims as follows:

"Preform" means a segment of plural, unidirectionally aligned fibers. The segment is cut to a specific length, and, in many cases, will be shaped (e.g., bent, twisted, etc.) to a specific form, as appropriate for the specific part being molded. Preforms are usually sourced from towpreg (i.e., the tow-preg is sectioned to a desired length), but can also be from another source of plural unidirectionally aligned fibers (e.g., from a resin impregnation process, etc.). The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" or "aligned fiber" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio—cross section, as above—of between about 10 to about 30), (ii) sheets of fiber, and (iii) laminates.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based/aligned fiber) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 150-300 psi (which will typically be the destination for a preform charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means +/−20% with respect to a stated figure or nominal value.

Additional definitions appear elsewhere in the disclosure, in context.

Embodiments of the invention involve the controllable and selective breakdown of polymers, typically due to polymer chain scission. The breakdown is referred to as "selective," because only a portion (i.e., less than all) of the polymer in a polymer form is so affected. Chain scission results in a reduction in the molecular-weight of the polymer.

Embodiments of the invention are used in conjunction with "polymer form(s)," which is defined for use in this disclosure and the appended claims as polymer in any form useful for molding/forming operations, and also refers to the finished parts formed from molding/forming operations. Non-limiting examples of polymer forms include resin pellets, filament prepreg (resin-impregnated fiber bundles) or tape prepreg, fiber-bundle-based preforms (e.g., shaped or straight segments of towpreg having a desired length), preform charges (arrangements of preforms), near-net-shape parts, and finished parts (both resin-only parts as well as composite parts). Although embodiments of the invention can be used in conjunction with a finished part, doing so is likely to require remolding of the part, which is typically undesirable.

The polymeric material may itself be a composite consisting of fillers, additives, powders (e.g., polymer, metallic, ceramic, etc.), and fibers. With respect to the last item—fibers—embodiments of the invention may be used in conjunction with prepreg (i.e., polymer-resin impregnated fibers). Such fibers include, without limitation, carbon, glass, aramid, boron, metal, ceramic, basalt, flax, hemp, conductive wires, and polymer filaments.

Methods in accordance with the present teachings apply to any thermoplastic polymer. Nonlimiting examples of thermoplastic polymers include: acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

In some embodiments, the method is used with dissimilar polymer units; that is, a polymer form may comprise more than one polymer, or if multiple polymer forms are involved, one or more of such forms may comprise a different polymer than some of the other forms. However, for such applications, the polymers must be miscible to at least some degree.

If the molecular weight of a region of a polymer form is reduced to an extreme degree, it is likely that it will be unable to bond sufficiently (i.e., extensively enough) to relatively higher molecular-weight polymer. The molecular weight (or the amount of reduction) at which this occurs is highly dependent on a number of factors, including, without limitation, the particular polymer being used, the chain length of the relatively lower-molecular weight region compared to the chain length of the relatively higher molecular-weight region, and the loading (in use) of the part.

It is notable that the breakdown in the relatively higher molecular-weight starting polymer is preserved throughout any subsequent processing (e.g., bending, arranging into a preform charge, etc.), such that any relatively lower molecular-weight polymer that is formed is present for the eventual molding into a finished part.

FIG. 1 depicts region 102 of polymer form 100 being exposed to scission-causing stressor 103. The scission-causing stressor, which in this embodiment is exposure to UV laser light 104 from laser 105, reduces the molecular weight of polymer form 100 at region 102.

Figure 2:
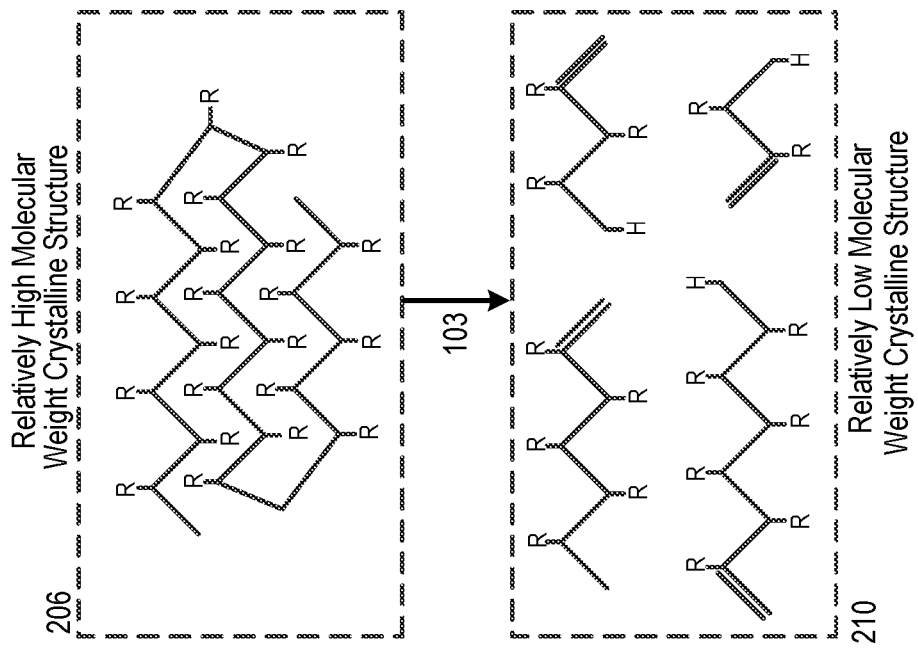
FIG. 2 depicts an example of polymer-chain scission.

FIG. 2 depicts an example of polymer chain scission, wherein relatively higher molecular-weight crystalline polymer 206 is selectively broken down, via scission-causing stressor 103, to relatively lower molecular weight crystalline polymer 210. Any of a variety of scission-causing stressors 103 can be used in conjunction with embodiments of the invention.

The term "scission-causing stressor," as used in this disclosure and the appended claims, means a factor that causes scission of the chains of a polymer, resulting in a reduction in the molecular weight of the polymer Stressors known to cause chain scission include, among others, electromagnetic radiation having a wavelength of visible light or less (such as ultraviolet light), oxygen exposure, moisture, heat cycling, chemical exposure, sound (such as ultrasonic frequencies).

Exposure of the polymer form to the scission-causing stressor must be controlled to result in an appropriate amount of chain scission; that is, an appropriate reduction in molecular-weight of the polymer. If the exposure to the scission-causing stressor is not controlled, polymer in the polymer form, and/or the polymer form itself could be damaged or otherwise undesirably affected, as discussed below.

The specifics of the "controlled exposure" depend on: (i) the particular stressor causing the scission, and (ii) the polymer of interest. Each type of stressor may have different parameters that control the extent of chain scission. For example, if the stressor is UV light (causing photolysis), parameters of the UV light that can be individually controlled to achieve an appropriate reduction in molecular weight include: (a) the power of the light, (b) the wavelength of the light, (c) the spot size of the light, and/or (d) the exposure time to the light, among any others. And since each polymer is unique, an appropriate range of values for the parameters—the process settings—will be specific to the particular polymer being used.

Continuing with the example of UV light, if the power is too high, polymer in the exposed region of the polymer form may burn, causing vaporization rather than chain scission. Also, if the selected UV wavelength is not absorbed by the polymer in the polymer form, then scission of the polymer chains will not occur. Furthermore, even if the power setting and wavelength range is otherwise appropriate for reducing the polymer's molecular weight, but the exposure time is too long, then the exposed region of the polymer form itself can be damaged. Such damage can include cracks or crazing, or the mechanical properties of the part produced therefrom not meet specification. Moreover, the polymer at such an over exposed region might have an excessively low melt and heat deflection temperature (i.e., problematic if it's too close to the use temperature), an excessively increased melt flow (which is hard to control and manage in a molding process, and can result in higher flash, thereby reducing the fiber volume content of the final part).

With respect to sound, in some embodiments, a high-power ultrasonic transducer is directed at regions of interest on the polymer form to break up the polymer chains and reduce the molecular weight. The power, frequency, spot size, and exposure time are tuned to control the reduction in molecular weight, in analogous fashion to the previously described embodiment of exposure to UV laser light.

As to heat, in some embodiments, controlled, directed heat cycles are used to selectively reduce a polymer's molecular weight. At the high end of the melt temperature range but below the burning point, a polymer undergoes "degradation" where chain scission takes place. By controlling the temperature of the heat-affected zone, and exposure time, the degradation of the polymer can be controlled and localized.

Directed chemical exposure, such as to acids, alkalis, some salts, etc., is used to degrade one or more selected regions of a polymer form, thereby reducing the molecular weight of the polymer in those regions. And in yet some additional embodiments, environmental factors, such as exposure to moisture, oxygen, or the like is used to degrade one or more regions of a polymer form to controllably reduce its molecular weight.

A desired value or range of values for the parameters being used to control a given stressor, so as to achieve an appropriate reduction in molecular weight for a particular polymer, can be determined by simple experimentation, coupled with knowledge of the properties of the polymer and the end use for a particular part. Alternatively, finite element analysis (FEA) can be used to estimate an appropriate range of values for the parameters of interest.

The purpose of the "controlled exposure" to the "scission-causing stressor" is to achieve an "appropriate amount of molecular-weight reduction." Because embodiments of a method in accordance with the present teachings apply to a wide variety of polymers, each characterized by a range of molecular weight, it is not possible to provide, a priori, global guidance on the extent of molecular-weight reduction. As a general guideline, embodiments of the invention will be used in conjunction with polymers having nominal weight-average molecular weights of about 10,000 to about 300,000 g/Mol. In accordance with the present teachings, "an appropriate reduction in molecular weight" is in the range of about 10% to about 50%.

For example, PLA (polylactic acid or polylactide) may having a starting weight-average molecular weight as high as about 200,000 g/Mol, which is likely to be reduced to about 100,000 g/Mol in accordance with the present teachings. PEEK (polyether ether ketone), on the other hand, may have a starting weight-average molecular weight of about 37,000 g/Mol, which may be reduced to about 23,000 g/Mol in conjunction with embodiments of the present invention.

FIGS. 3A through 3C depict an embodiment wherein the present teachings are used to create a part with an improved surface finish.

FIG. 3A depicts a portion of an assemblage of preforms (a layup of preforms or a preform charge) in a nascent fiber-composite part. More particularly, FIG. 3A depicts a portion of a single preform; that is, preform 308. Simplified for the illustration, each preform 308 comprises thousands of strands of carbon fiber 312 impregnated with relatively higher molecular-weight polymer resin 306. The figure is not to scale, as the diameter of carbon fiber is about 10,000 times that of a polymer chain. In FIG. 3A, note the layer of relatively higher molecular-weight polymer 306 between individual carbon fibers 312.

FIG. 3B depicts the portion of the assemblage of FIG. 3A after application of scission-causing stressor 103 in accordance with the present teachings. Scission-causing stressor 103 reduces the molecular weight of the targeted polymer layers, resulting in relatively lower molecular-weight polymer 310. The relatively lower molecular-weight polymer resulting from molecular-weight reduction is considerably more mobile (i.e., has a higher melt flow) than the untreated relatively higher molecular-weight polymer.

FIG. 3C depicts the portion of the assemblage of FIGS. 3A and 3B after relatively lower molecular-weight polymer 310 migrates to the surface of the nascent part, as facilitated by its reduced molecular weight. This creates resin-rich surface 311. In the absence of this relatively lower molecular-weight region, the polymer in the preforms would not readily flow to the surface, potentially leaving the surface with visually and even physically exposed carbon fibers 312. It is notable that given the likely range of molecular weights in the lower molecular-weight polymer 310, some (a minority portion of) the polymer chains thereof will remain between fibers 312. This, in fact, is beneficial, since all fibers 312 should be surrounded by polymer resin (i.e., full wetout is desired).

With resin-rich surface 311 established, the molding process, such as compression molding, proceeds.

FIGS. 4C and 4D depict the application of the present teachings to create a part having a fine (i.e., small) feature; FIGS. 4A and 4B depict a drawback of applicant's own earlier processes for forming such fine features. Note that these Figures are not to scale; as previously noted, relative to the polymer chains 306 or 310, fibers 312 actually have a much larger diameter than shown. Furthermore, cavity 413, for forming a fine feature, is much larger than it appears, having a width that is typically substantially greater than the diameter of fiber 312.

FIG. 4A depicts a portion of an assemblage of preforms in a nascent fiber-composite part. More particularly, FIG. 4A depicts a portion of a single preform; that is, preform 308. A layer of relatively higher molecular-weight polymer 306 is disposed between individual carbon fibers 312.

FIG. 4B depicts an attempt to mold a part having a fine feature, but without first using selective molecular-weight reduction in accordance with the present teachings. As depicted, the relatively long polymer chains of relatively higher molecular-weight polymer 306, and the concomitant chain entanglement, prevent the polymer from fully filing portion 413 of the mold cavity that defines the fine feature.

In FIG. 4C, a scission-causing stressor has been applied to a portion of preform 308 of the assemblage depicted in FIG. 4A. That results in selective molecular-weight reduction of relatively higher molecular-weight polymer 306 to form relatively lower molecular-weight polymer 310.

As depicted in FIG. 4D, relatively lower molecular-weight polymer 310 resulting from the method, with its higher melt flow and shorter chain lengths, flows readily into portion 413 of the mold cavity, to form the fine feature.

In applications in which the fine feature is required to contain fiber throughout its (small) volume, applicant has observed that it is problematic to create such a feature if its dimensions are smaller than about 15 millimeters (mm) width×about 15 mm height×about 15 mm length. The smaller the "mouth" of the cavity that forms the fine feature, the greater the likelihood that fibers will flow only partially into the "opening" of the cavity, damming it before the fibers can flowing to its far end. Of course, the actual aspect ratio (i.e., cross sectional opening to length), polymer type, and fiber type will impact the ability to adequately flow fibers into a cavity that forms the fine feature. With respect to aspect ratio, the longer the cavity, the more difficult it will be for fibers to flow to its distal end.

However, utilizing the present teachings, a scissioned, relatively lower molecular-weight resin is capable of passing the "fiber dam" that is created near the opening to the small cavity, thereby being able to fill the small cavity and create a resin-rich fine feature. In the presence of a composite (resin and fiber) feed, this technique, unlike the prior art, can be used to create resin-rich fine features even somewhat smaller than 0.1 mm.

It is notable that the foregoing discussion applies to small cavities that are not parallel to the long axis of the main mold cavity. Consider that the flow of resin through the mold cavity, as caused by pressurizing the mold, will substantially align with the long axis of the mold cavity, at least on a macro level. Thus, in the case of a small cavity that is parallel to the long axis of the mold cavity, to the extent that fiber is flowing in the resin, such "on-axis" flowing fiber will tend to flow directly into the mouth of cavity. Such fiber has a greater likelihood of flowing to the distal end of the cavity without damming, as compared to small cavities that are off-axis. The further off-axis the orientation of the mouth (90 degrees being the maximum) of the small cavity from the overall mold cavity, the greater the likelihood of damming.

For the purposes of this disclosure and the appended claims, a "fine feature" or "a cavity for forming a fine feature" has at least one lateral cross-sectional dimension of 15 mm or less in embodiments in which (a) fiber is present in the mold cavity, and (b) the cavity forming the fine feature is off-axis from the long axis of the mold cavity.

Embodiments of the present invention can be used to bond two or more polymer forms to one another. If the regions at which two or more polymer forms are to be bonded together have relatively lower molecular weight than neighboring regions of the polymer forms, then those regions—the bonding regions—will have a lower melting temperature than the neighboring regions. Consequently, the bonding regions can bond under heat while the rest of the material remains in the solid state. This enables heat to be applied globally across the polymer forms in a mold or fixture, wherein only the lower molecular-weight regions will melt and bond, as long as the heat is applied at the melt temperature of the lower molecular-weight polymer regions and below the melt temperature of the higher molecular-weight polymer regions. Moreover, having a localized region where polymer flows more easily and melts at a lower temperature compared to the rest of the polymer form reduces the risk of overheating and burning the polymer.

FIGS. 5A and 5B depict the application of the present teachings for bonding polymer forms together, such as tacking (joining) preforms 514 and 516 together to form a preform charge.

FIG. 5A depicts the application of scission-causing stressor 103 to region 515 and region 517 of respective preforms 514 and 516, thereby reducing the molecular weight of the polymer in those regions. Regions 515 and 517 are the regions at which preforms 514 and 516 are to be tacked together.

FIG. 5B depicts the uniform application of heat 518 to preforms 514 and 516 to bond them together. By virtue of relatively lower molecular-weight regions 515 and 517, only the desired regions (i.e., regions 515 and 517) will soften and bond, notwithstanding the global application of heat 518. As a consequence of this localized melting, the likelihood of charring or burning is substantially reduced.

In some embodiments, the source of scission-causing stressor 103 (e.g., laser, etc.) can be integrated directly into the polymer-shaping process. The shaping process can include compounding, extrusion, pultrusion, slurry impregnation, and other polymer-shaping and forming methods.

In some further embodiments, a mix of relatively high and relatively low molecular-weight resins is obtained by starting with polymer forms that are made from either relatively lower or higher molecular weights. A combination of these forms can be organized to create, for example, a preform charge that incorporates higher molecular-weight resins in relatively higher-stress areas and lower molecular-weight resins in areas requiring higher melt flow or lower melt temperature.

It is to be understood that the disclosure describes a few embodiments and that many variations of the invention can easily be devised by those skilled in the art after reading this disclosure and that the scope of the present invention is to be determined by the following claims.

What is claimed:

1. A method comprising:
    exposing, to a first scission-causing stressor, a first region of a first polymer form, the first polymer form including fibers, wherein:
        (a) a first parameter of the first scission-causing stressor is controlled to achieve a first amount of scission in a first relatively higher molecular-weight polymer at the first region,
        (b) the first amount of scission resulting in a reduction in a weight average molecular weight of the first relatively higher molecular-weight polymer, thereby forming a first relatively lower molecular-weight polymer at the first region,
        (c) the reduction is in a range of about 10 to about 50 percent, and
        (d) the weight average molecular weight of the first relatively higher molecular-weight polymer at a second region of the first polymer form is not reduced; and
    creating a desired surface finish of the first polymer form, or a part formed therefrom, by applying pressure to the first polymer form, the pressure causing the first relatively lower molecular-weight polymer to flow to a surface of the first polymer form, wherein the desired surface finish is characterized by a lack of a visible or physical presence of the fibers.

2. The method of claim 1 wherein the scission-causing stressor is selected from the group consisting of ultraviolet light, temperature, a chemical, and ultrasound.

3. The method of claim 1 wherein applying pressure comprises placing the first polymer form in a mold cavity and applying pressure to the mold cavity.

4. A method comprising:
    exposing, to a first scission-causing stressor, a first region of a first polymer form, the first polymer form including fibers, wherein:
        (a) a first parameter of the first scission-causing stressor is controlled to achieve a first amount of scission in a first relatively higher molecular-weight polymer at the first region,
        (b) the first amount of scission resulting in a reduction in a weight average molecular weight of the first relatively higher molecular-weight polymer, thereby forming a first relatively lower molecular-weight polymer at the first region,
        (c) the reduction is in a range of about 10 to about 50 percent, and
        (d) the weight average molecular weight of the first relatively higher molecular-weight polymer at a second region of the first polymer form is not reduced; and
    within a mold cavity, flowing the first relatively lower molecular-weight polymer into a first cavity for forming a fine feature, and completely filling the first cavity with the relatively lower molecular-weight polymer by applying pressure to the mold cavity.

5. A method comprising:
    exposing, to a first scission-causing stressor, a first region of a first fiber-bundle-based preform, the first fiber-bundle-based preform including plural aligned fibers and resin,
    exposing, to a second scission-causing stressor, a first region of a second fiber-bundle-based preform, the second fiber-bundle-based preform including plural aligned fibers and resin, wherein:
        (a) a first parameter of the first scission-causing stressor is controlled to achieve a first amount of scission in a first relatively higher molecular-weight polymer at the first region of the first fiber-bundle-based preform,
        the first amount of scission resulting in a reduction in a weight average molecular weight of the first relatively higher molecular-weight polymer, thereby forming a first relatively lower molecular-weight polymer at the first region of the first polymer form,
        (b) a first parameter of the second scission-causing stressor is controlled to achieve a second amount of scission in a second relatively higher molecular-weight polymer at the first region of the second fiber-bundle-based preform, the second amount of scission resulting in a reduction in a weight average molecular weight of the second relatively higher molecular-weight polymer, thereby forming a second relatively lower molecular-weight polymer at the first region of the second fiber-bundle-based preform, (c) the reduction in the weight average molecular weight of the first relatively higher molecular weight polymer is in a range of about 10 to about 50 percent, (d) the reduction in the weight average molecular weight of the second relatively higher molecular weight polymer is in a range of about 10 to about 50 percent, (e) the weight average molecular weight of the first relatively higher molecular-weight polymer at a second region of the first fiber-bundle-based preform, and of the second relatively higher molecular-weight polymer at a second region of the second fiber-bundle-based preform is not reduced; and wherein, with the first fiber-bundle-based preform and the second fiber-bundle-based preform abutting one another at respective first regions thereof, applying heat to the first fiber-bundle-based preform and the second fiber-bundle based preform, wherein the heat is applied at or above the melt temperature of the first relatively lower molecular-weight polymer and the second relatively lower molecular-weight polymer, and below the melt temperature of the first higher molecular-weight polymer and the second relatively higher molecular weight polymer, thereby bonding the first region of the first fiber-bundle-based preform to the first region of the second fiber-bundle-based preform.

6. The method of claim 5 wherein the heat is uniformly applied to the first fiber-bundle-based preform and the second fiber bundle-based preform.

7. The method of claim 5 wherein the first relatively higher molecular-weight polymer and the second relatively higher molecular-weight polymer are the same polymer.

8. The method of claim 7 wherein first scission-causing stressor and the second scission-causing stressor are the same scission-causing stressor.

9. The method of claim 5 wherein the first relatively higher molecular-weight polymer and the second relatively higher molecular-weight polymer are different relatively higher molecular-weight polymers.

10. The method of claim 9 wherein the first scission-causing stressor and the second scission-causing stressor are the same scission-causing stressor.

11. The method of claim 10 wherein the first parameter of the first scission-causing stressor and the first parameter of the second scission-causing stressor are the same parameter.

12. The method of claim 11 wherein an amount of the reduction in the weight average molecular weight of the first relatively higher molecular-weight polymer and an amount of the reduction in the weight average molecular-weight polymer of the second relatively higher molecular-weight polymer are different amounts.

13. The method of claim 11 wherein a value for the first parameter of the first scission-causing stressor to achieve a first amount of scission in the first relatively higher molecular-weight polymer is different than a value for the first parameter of the second scission-causing stressor to achieve a first amount of scission in the second relatively higher molecular-weight polymer.

* * * * *